United States Patent
Shigeeda (10) Patent No.: US 11,700,453 B2
(45) Date of Patent: Jul. 11, 2023

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Soichiro Shigeeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 17/315,100

(22) Filed: May 7, 2021

(65) Prior Publication Data
US 2021/0360163 A1   Nov. 18, 2021

(30) Foreign Application Priority Data
May 15, 2020   (JP) .............................. JP2020-086085

(51) Int. Cl.
*H04N 23/695* (2023.01)
*H04N 23/661* (2023.01)
*G01B 7/30* (2006.01)
*G01B 11/26* (2006.01)

(52) U.S. Cl.
CPC ......... *H04N 23/695* (2023.01); *H04N 23/661* (2023.01); *G01B 7/30* (2013.01); *G01B 11/26* (2013.01)

(58) Field of Classification Search
CPC .... H04N 23/695; H04N 23/661; H04N 23/60; H04N 23/50; G01B 7/30; G01B 11/26
See application file for complete search history.

(56) References Cited

U.S. PATENT DOCUMENTS

2013/0111410 A1* 5/2013 Okada .................. G06F 3/0489
715/841
2014/0002720 A1* 1/2014 Shigeeda ............... H04N 23/71
348/362

FOREIGN PATENT DOCUMENTS

JP   2003-087517 A   3/2003

\* cited by examiner

*Primary Examiner* — Muhammad S Islam
(74) *Attorney, Agent, or Firm* — Canon U.S.A., Inc., I.P. Division (57) ABSTRACT

An image capturing apparatus to perform pan-tilt driving includes a detection unit, an obtaining unit, and a setting unit. The detection unit detects a movable range end in a case where the pan-tilt driving is performed. The obtaining unit obtains information about a speed of the pan-tilt driving in a case where the movable range end is detected by the detection unit. The setting unit sets a reference position according to the driving speed information obtained by the obtaining unit.

15 Claims, 8 Drawing Sheets

REFERENCE POSITION IS DEVIATED.
IF YOU WANT TO CORRECT TO THE RIGHT POSITION, PLEASE SELECT "YES".

YES    NO

FIG.8C

| | REFERENCE POSITION A NO CORRECTION | REFERENCE POSITION B CORRECTION VALUE α CORRECT BY 10 °/S OR LESS | REFERENCE POSITION C CORRECTION VALUE β CORRECT BY 5 °/S |
|---|---|---|---|
| PRESET MOVEMENT X COORDINATE: m Y COORDINATE: n | m n | m + α n + α | m + β n + β |

IMAGE CAPTURING APPARATUS, METHOD FOR CONTROLLING THE SAME, AND STORAGE MEDIUM

BACKGROUND

Field

The present disclosure relates to an image capturing apparatus, a method for controlling the same, a program, and a storage medium.

Description of the Related Art

An image reading apparatus is conventionally known which performs processing for returning a reference position to an actual home position in a case where an actual position of an image sensor is deviated from a value of a position counter (for example, refer to Japanese Patent Application Laid-Open No. 2003-087517).

SUMMARY

The present disclosure is directed to a technique for setting a reference position without impairing user operability.

According to an aspect of the present disclosure, an image capturing apparatus to perform pan-tilt driving includes a detection unit configured to detect a movable range end in a case where the pan-tilt driving is performed, an obtaining unit configured to obtain information about a speed of the pan-tilt driving in a case where the movable range end is detected by the detection unit, and a setting unit configured to set a reference position according to the driving speed information obtained by the obtaining unit.

Further features of the present disclosure will become apparent from the following description of exemplary embodiments with reference to the attached drawings.

DESCRIPTION OF THE EMBODIMENTS

Various exemplary embodiments of the present disclosure will be described in detail below with reference to the attached drawings. Description will be given below of a case where an image capturing apparatus is a remote camera 100 which can perform pan driving and tilt driving (pan-tilt driving).

Figure 1:
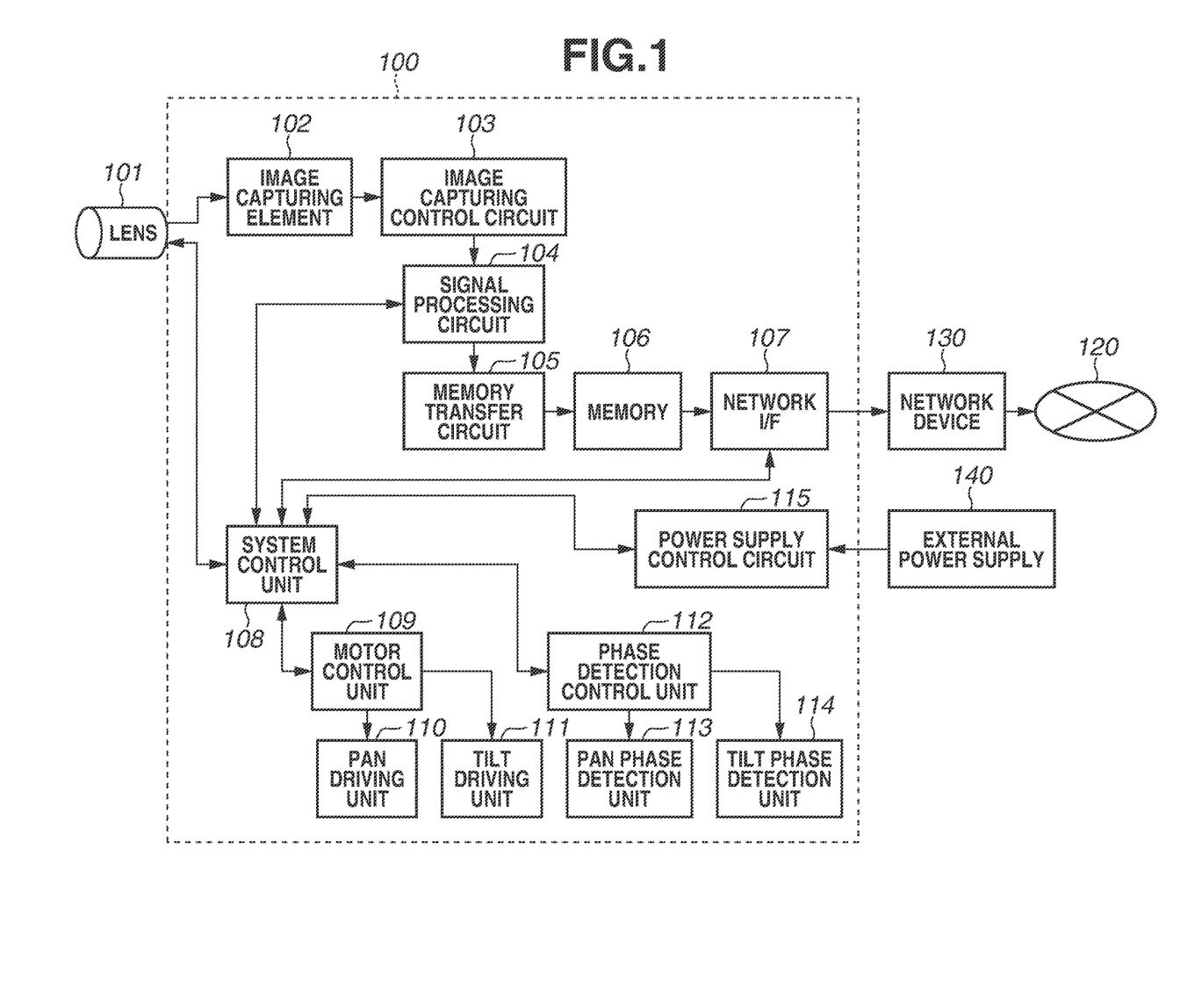
FIG. 1 is a block diagram illustrating an example of a configuration of a remote camera.

FIG. 1 is a block diagram illustrating an example of a configuration of the remote camera 100.

The remote camera 100 is connected to a not illustrated client apparatus (an information processing apparatus) in a mutually communicable state via a network 120.

The remote camera 100 includes a lens 101, an image capturing element 102, an image capturing control circuit 103, a signal processing circuit 104, a memory transfer circuit 105, a memory 106, a network interface (I/F) 107, and a system control unit 108. The remote camera 100 further includes a motor control unit 109, a pan driving unit 110, a tilt driving unit 111, a phase detection control unit 112, a pan phase detection unit 113, a tilt phase detection unit 114, and a power supply control circuit 115.

The lens 101 is a lens group including a zoom lens, a focus lens, a vibration-proof lens, and an aperture blade. The lens 101 controls each block in the lenses based on an instruction from the system control unit 108. Specifically, the lens 101 controls the zoom lens, the focus lens, the vibration-proof lens, and the aperture blade. The image capturing element 102 converts light that forms an image through the lens 101 into an electric charge and generates an image capturing signal. The image capturing control circuit 103 controls the image capturing element 102 in a same cycle as an image output cycle. Further, in a case where an accumulation time is longer than the image output cycle, the image capturing control circuit 103 controls the signal processing circuit 104 to hold a captured image in a frame memory of the signal processing circuit 104 for a period during which the image capturing element 102 cannot output an image capturing signal.

The signal processing circuit 104 digitizes the image capturing signal captured by the image capturing element 102 and generates a captured image. The memory transfer circuit 105 transfers the captured image digitized by the signal processing circuit 104 to the memory 106. The memory 106 temporarily stores the transferred captured image. The network I/F 107 is an interface for connecting to a network device 130. The system control unit 108 controls an entire remote camera 100. A network communication function of the remote camera 100 is constructed by the memory 106, the network I/F 107, and the system control unit 108.

The system control unit 108 distributes image data transferred to the memory 106 to the client apparatus by transmitting the image data to the network 120 via the network I/F 107 and the external network device 130. The network I/F 107 receives a camera control command transmitted from the client apparatus and transmits the camera control command to the system control unit 108. The system control unit 108 transmits a response to the camera control command to the client apparatus. The system control unit 108 analyzes the transmitted camera control command and performs processing according to the camera control command. For example, the system control unit 108 instructs the signal processing circuit 104 to set an image quality and instructs the motor control unit 109 to perform the pan driving and the tilt driving. The signal processing circuit 104 performs image processing based on the instruction. The motor control unit 109 controls the pan driving unit 110 and the tilt driving unit 111 based on the instruction. The pan driving unit 110 and the tilt driving unit 111 each include a motor, a gear, and a belt.

The phase detection control unit 112 is a control unit for detecting a phase of each component to be driven by the pan driving unit 110 and the tilt driving unit 111. The phase detection control unit 112 detects phase signals from the pan phase detection unit 113 and the tilt phase detection unit 114. For example, the pan phase detection unit 113 and the tilt phase detection unit 114 each include a photo interrupter (PI) sensor, and the phase detection control unit 112 performs detection processing based on whether the PI sensor is shielded or not by a light-shielding plate.

The power supply control circuit 115 is, for example, a direct current to direct current (DC-DC) converter and includes a switching circuit for switching control modules to be energized. Power supply to the remote camera 100 is controlled by receiving power supply from the network device 130 or an external power supply 140 via a network cable or a power supply cable.

The network device 130 can supply power to the remote camera 100 via the network cable in addition to receiving image distribution from the remote camera 100. The power is supplied using a cable conforming to a power supply standard from a wired local area network (LAN) cable, such as Power over Ethernet (PoE) and PoE+. The external power supply 140 includes a commercial power supply and a DC power supply and can supply the power to the remote camera 100.

Figure 2A:
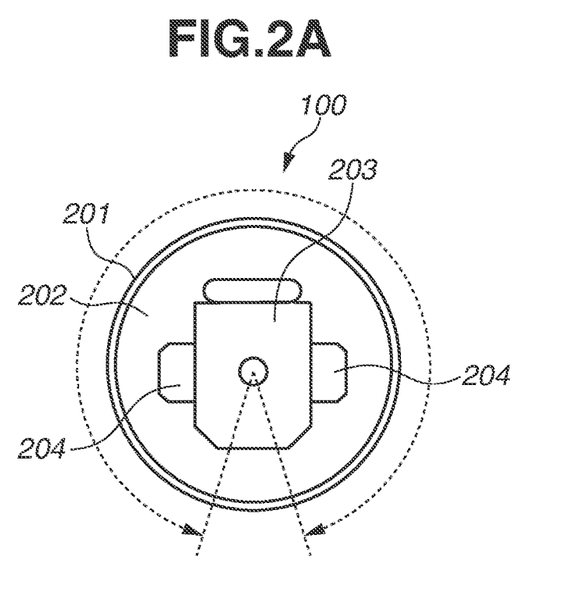
FIGS. 2A to 2C illustrate examples of a mechanism of the remote camera.
Figure 2B:
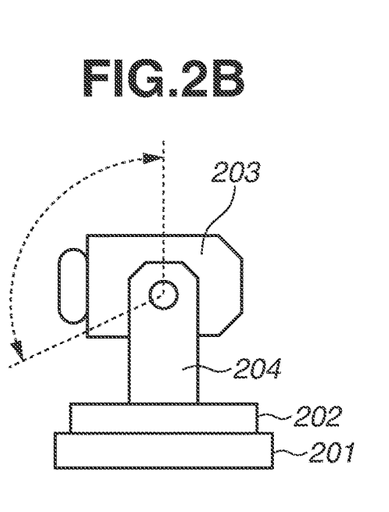
Figure 2C:
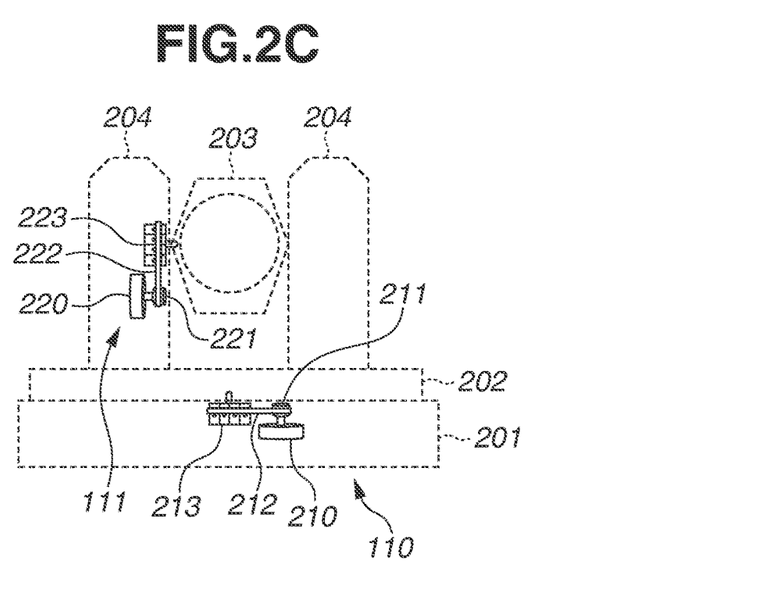

FIGS. 2A to 2C illustrate examples of a mechanism of the remote camera 100. FIGS. 2A, 2B, and 2C are respectively a top view, a side view, and a part of a perspective front view of the remote camera 100.

The remote camera 100 includes a bottom case 201, a turntable 202, a camera head 203, a camera head support portion 204, a pan motor 210, a tilt motor 220, motor gears 211 and 221, belts 212 and 222, and driving gears 213 and 223.

The pan driving unit 110 includes the pan motor 210, the motor gear 211, the belt 212, and the driving gear 213. In the pan driving unit 110, the pan motor 210 rotates the motor gear 211 to rotate the driving gear 213 via the belt 212, and the turntable 202 horizontally rotates in a right-and-left direction with respect to the bottom case 201 in accordance with the rotation of the driving gear 213. According to the present exemplary embodiment, when the pan driving unit 110 is driven, the turntable 202 can move to rotate in the right-and-left direction (a pan direction) from −170° to +170°.

The tilt driving unit 111 includes the tilt motor 220, the motor gear 221, the belt 222, and the driving gear 223. In the tilt driving unit 111, the tilt motor 220 rotates the motor gear 221 to rotate the driving gear 223 via the belt 222, and the camera head 203 rotates in a vertical direction (a tilt direction) with respect to the camera head support portion 204 in accordance with the rotation of the driving gear 223. According to the present exemplary embodiment, when the tilt driving unit 111 is driven, the camera head 203 can move to rotate from −20° in an obliquely downward direction to 90° in a directly upward direction in a case where a horizontal direction is 0°.

As described above, the remote camera 100 according to the present exemplary embodiment can capture an image by changing an image capturing direction since the turntable 202 can rotate in the right-and-left direction and the camera head 203 can rotate in the vertical direction.

Figure 3A:
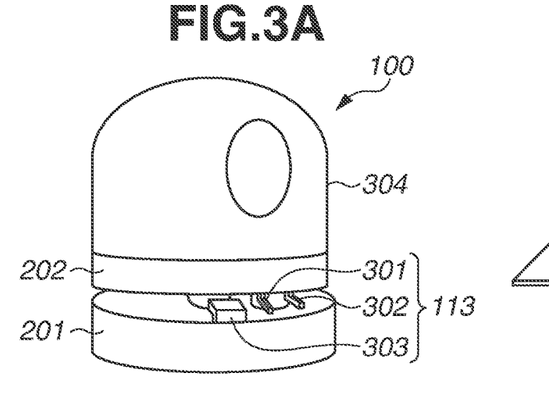
FIGS. 3A to 3D illustrate a method for detecting a movable range end.

FIGS. 3A to 3D illustrate a method for detecting a movable range end of the turntable 202. FIG. 3A illustrates a position of the PI sensor in a case where the remote camera 100 is viewed from the side. FIG. 3A illustrates a state in which the camera head 203 is covered with a dome-shaped lens cover 304. As illustrated in FIG. 3A, the pan phase detection unit 113 includes PI sensors 301 and 302 and a light-shielding plate 303. The PI sensors 301 and 302 are fixed to an outer peripheral edge of the turntable 202 and integrally rotate with the turntable 202. The PI sensors 301 and 302 are located slightly apart from each other in a circumferential direction of the turntable 202. The light-shielding plate 303 is fixed to the bottom case 201 and shields the PI sensors 301 and 302 from light.

Figure 3B:
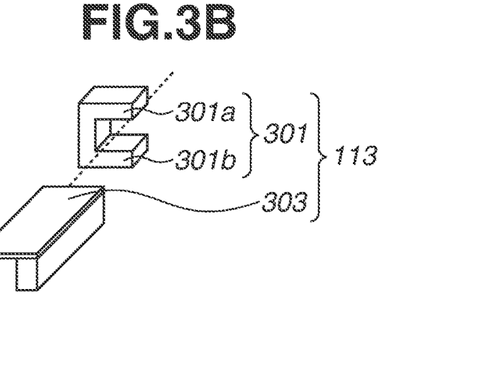

FIG. 3B is an enlarged perspective view of the PI sensor 301 and the light-shielding plate 303. When the turntable 202 rotates to the movable range end, the light-shielding plate 303 is located between an upper portion 301a and a lower portion 301b of the PI sensor 301. In a case where light emitted from the upper portion 301a is received by the lower portion 301b, the PI sensor 301 outputs a voltage A. On the other hand, in a case where the light from the upper portion 301a is blocked by the light-shielding plate 303 and cannot be received by the lower portion 301b, the PI sensor 301 outputs a voltage B different from the voltage A. Information about the voltage output from the PI sensor 301 is transmitted to the system control unit 108 via the phase detection control unit 112. The PI sensor 302 includes a configuration similar to that of the PI sensor 301.

Figures 3C, 3D:
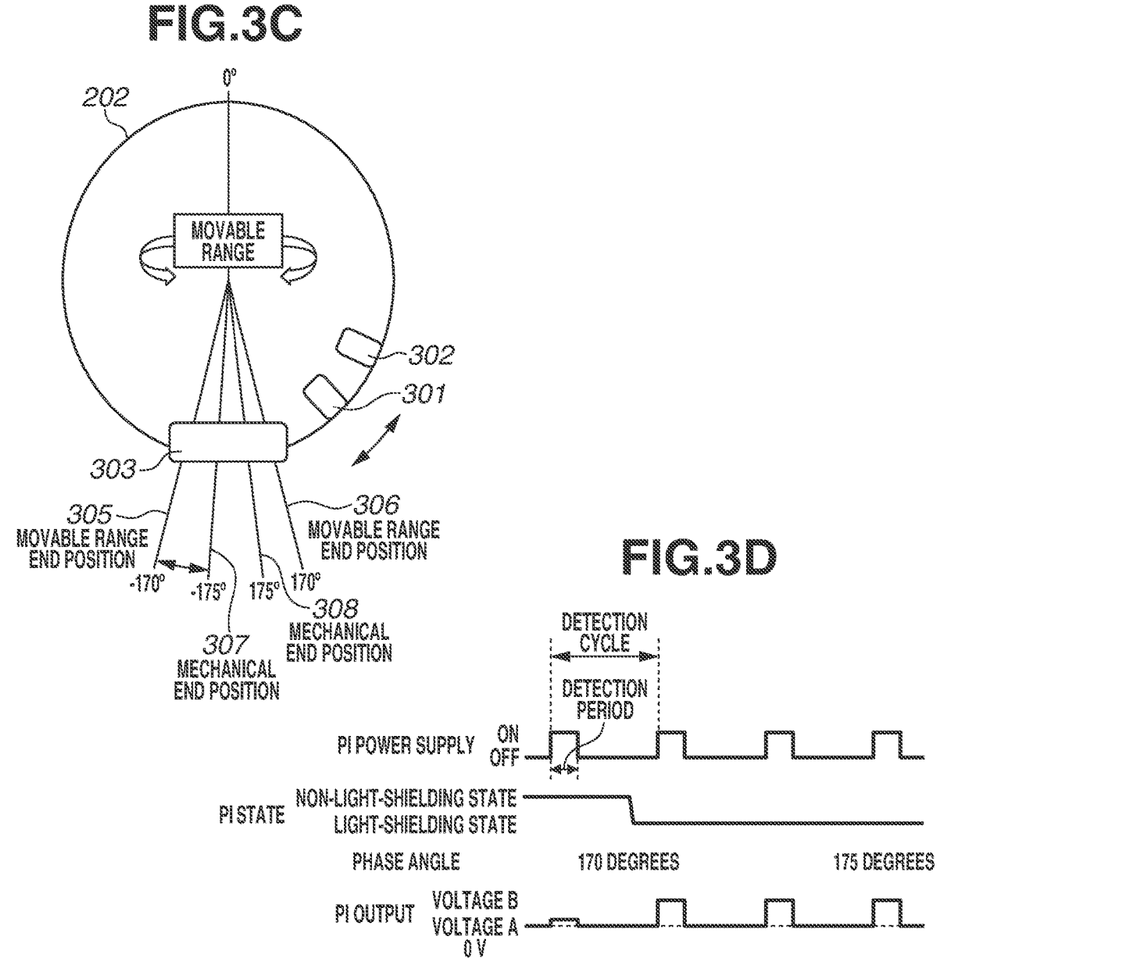

FIG. 3C illustrates a positional relationship between the PI sensor and the light-shielding plate in a case where the remote camera 100 is viewed from the top. The pan driving unit 110 can perform the pan driving on the turntable 202 from −175° to +175° in the right-and-left direction. However, a movable range is from −170° to +170° in order not to cause a collision between a member which rotates and a member which does not rotate in a case where the turntable 202 performs the pan driving from −175° to +175°.

As illustrated in FIG. 3C, a movable range end position 305 in rotation in a counterclockwise direction is located at −170°, and a movable range end position 306 in rotation in a clockwise direction is located at 170°. In addition, a mechanical end position 307 in the rotation in the counterclockwise direction is located at −175°, and a mechanical end position 308 in the rotation in the clockwise direction is located at 175°. The mechanical end position is a limit position to which the turntable 202 can rotate. As illustrated in FIG. 3C, the light-shielding plate 303 is arranged from the movable range end position 305 to the movable range end position 306, so that a light-shielding state is maintained by positioning the PI sensors from the movable range end to the mechanical end. In other words, the PI sensor 301 is shielded by the light-shielding plate 303 at the movable range end position 306 of 170° and is maintained in the light-shielding state to the mechanical end position 308 of 175°. Further, the PI sensor 302 is shielded by the light-shielding plate 303 at the movable range end position 305 of −170° and is maintained in the light-shielding state to the mechanical end position 307 of −175°. The pan phase detection unit 113 may include a single PI sensor, and the single PI sensor may be shielded by the light-shielding plate 303 at the movable range end position 306 of 170° and shielded by the light-shielding plate 303 at the movable range end position 305 of −170°.

FIG. 3D illustrates intermittent control of the PI sensor. The PI sensor repeats ON and OFF according to a detection cycle. According to the present exemplary embodiment, the detection cycle is determined according to a pan driving speed, and an ON period (a detection period) is fixed to 30 milliseconds (msecs). The PI sensor respectively outputs the voltage A and the voltage B in a non-light-shielding state and the light-shielding state during the ON period. The PI sensor cannot perform detection during an OFF period and thus outputs 0 V. The detection cycle of the PI sensor can be set to the ON state at all times to detect the light-shielding state and the non-light-shielding state.

Next, an operation of the remote camera 100 including the above-described configuration will be described. The operation in the pan driving will be described below, but the same can be applied to the operation in the tilt driving.

Figure 4:
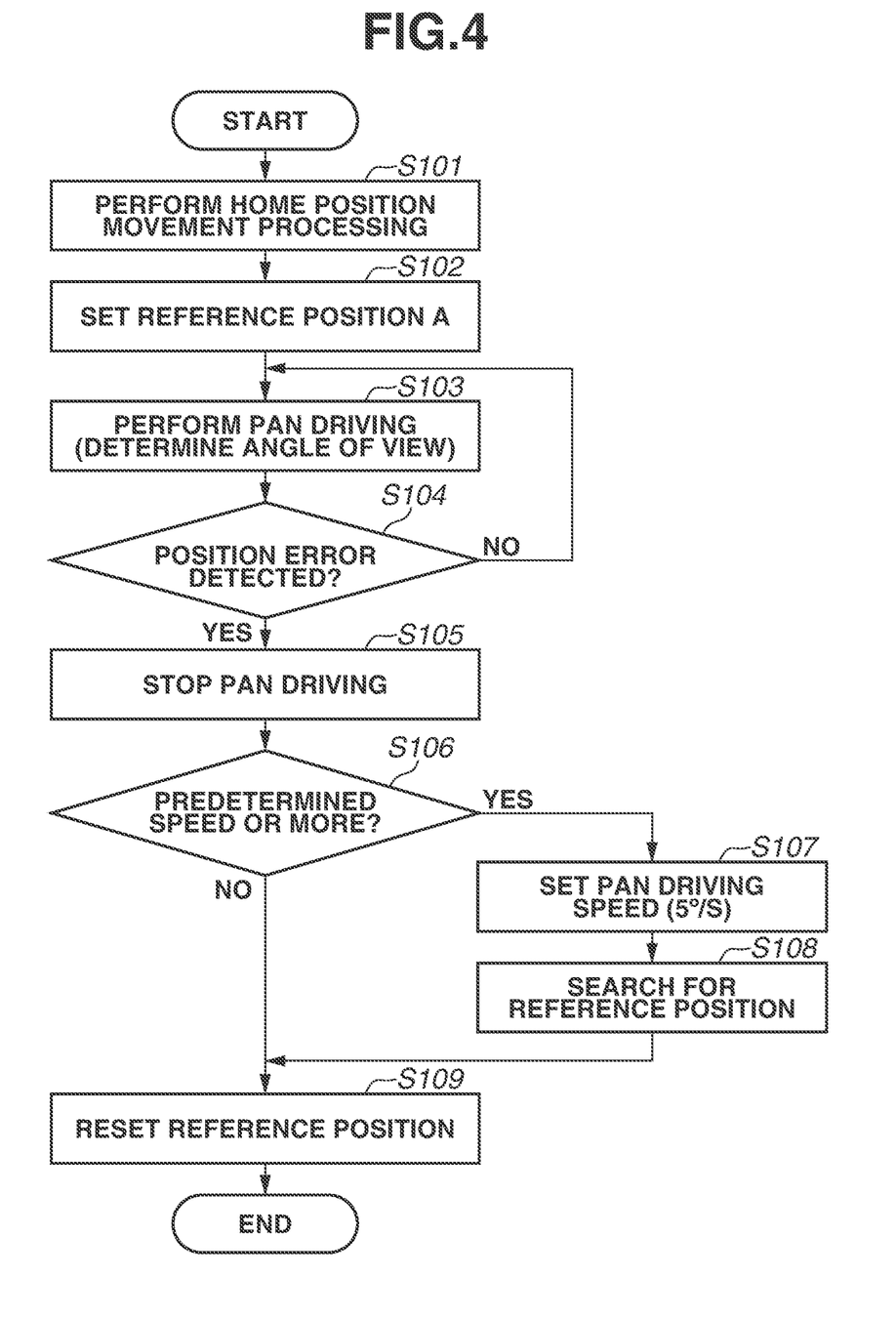
FIG. 4 is a flowchart illustrating an example of an operation according to a first exemplary embodiment.

FIG. 4 is a flowchart illustrating the operation according to a first exemplary embodiment. Processing in the flowchart in FIG. 4 is started when the power supply to the remote camera 100 is turned ON. As the first exemplary embodiment, a case will be described in which a reference position is set according to the pan driving speed at a time when a position error is detected.

In step S101, the system control unit 108 performs home position (HP) movement processing. The home position movement processing will be described with reference to FIG. 3C. First, the system control unit 108 sets the pan driving speed (a movement speed) to 50°/s and instructs the motor control unit 109 to rotate the turntable 202 in order to move the PI sensor 301 toward the mechanical end position 308. The motor control unit 109 drives the pan driving unit 110 to rotate the turntable 202. When the PI sensor 301 reaches the movable range end position 306, the system control unit 108 receives a signal from the pan phase detection unit 113 (the PI sensor 301) via the phase detection control unit 112. The system control unit 108 transmits a driving stop request to the motor control unit 109 in response to the reception of the signal, and thus the motor control unit 109 stops driving the pan driving unit 110. At that time, the turntable 202 does not stop immediately due to inertia, and the PI sensor 301 stops at a position approximately 1° away from the movable range end position 306 toward the mechanical end position 308.

Next, the system control unit 108 sets the pan driving speed to 5°/s and instructs the motor control unit 109 to rotate the turntable 202 in order to move the PI sensor 301 toward the movable range end position 306 to search for the movable range end position 306. The motor control unit 109 drives the pan driving unit 110 to rotate the turntable 202. When the PI sensor 301 reaches the movable range end position 306, the system control unit 108 receives the signal from the pan phase detection unit 113 (the PI sensor 301) via the phase detection control unit 112. The system control unit 108 transmits the driving stop request to the motor control unit 109 in response to the reception of the signal, and the motor control unit 109 stops driving the pan driving unit 110. At that time, the PI sensor 301 stops at a position approximately 0.1° away from the movable range end position 306 toward 0°. The system control unit 108 regards this position as a reference position A (a position of 170°) and instructs the motor control unit 109 to rotate the turntable 202 from the reference position A to the position of 0°. The motor control unit 109 drives the pan driving unit 110 to rotate the turntable 202 to the position of 0°, so that a rotation position of the turntable 202 can be moved to the home position. Similarly, for the tilt driving unit 111, the system control unit 108 instructs the motor control unit 109 to move the camera head 203 to the position of 0° using a position of −20° as the reference position, so that a rotation position of the camera head 203 can be moved to the home position.

In step S102, the system control unit 108 sets the reference position A. Specifically, the system control unit 108 stores the position of 170° searched in step S102 as the reference position A. The reference position A is stored as described above, so that the system control unit 108 can calculate the current rotation position of the turntable 202 based on the pan driving speed and a driving time in a case where the pan driving is performed.

In step S103, in a case where a user performs a pan operation, the system control unit 108 instructs the motor control unit 109 to drive the pan driving unit 110 according to the pan operation. The pan driving unit 110 drives the turntable 202 to rotate in the clockwise direction or the counterclockwise direction to change an angle of view of the camera head 203. At that time, the system control unit 108 drives the pan driving unit 110 at the pan driving speed (a rotation speed) selected by the user. The pan driving speed may be selected by a user as an arbitrary speed for each pan operation or may be selected from a plurality of set speeds. In addition, the system control unit 108 may be able to select an arbitrary speed or a plurality of set speeds by its own determination without being limited to the case where the user selects the pan driving speed.

In step S104, the system control unit 108 determines whether a position error is detected. In a case where the position error is detected (YES in step S104), the processing proceeds to step S105. Whereas, in a case where the position error is not detected (NO in step S104), the processing returns to step S103. Specifically, the system control unit 108 detects the position error by receiving a signal of the position error via the motor control unit 109 from the pan phase detection unit 113 which periodically performs position error detection processing. The position error means that the pan driving is performed beyond the movable range end. Normally, the system control unit 108 can control the motor control unit 109 to stop driving the pan driving unit 110 before the turntable 202 reaches the movable range end even if the pan operation is performed which exceeds the movable range end, and thus the position error does not occur. In other words, normally, the pan driving unit 110 does not perform the pan driving beyond the movable range end. However, for example, in a case where the turntable 202 or the camera head 203 is rotated by hand, or in a case where an object collides with the camera head 203, the reference position A is deviated, and the rotation position calculated by the system control unit 108 and the actual rotation position differ. Therefore, in a case where a pan operation exceeding the movable range end is performed, the system control unit 108 cannot stop driving the pan driving unit 110 before the turntable 202 reaches the movable range end, and the position error may occur.

A method for detecting the position error will be described with reference to FIG. 3B. In a case where the turntable 202 rotates in the clockwise direction, and the PI sensor 301 reaches the movable range end position 306, the light from the upper portion 301a is blocked by the light-shielding plate 303, and the lower portion 301b cannot receive the light. Accordingly, the PI sensor 301 outputs the voltage B. On the other hand, in a case where the PI sensor 301 does not reach the movable range end position 306, the light from the upper portion 301a is received by the lower portion 301b. Accordingly, the PI sensor 301 outputs the voltage A. Therefore, the system control unit 108 can determine whether there is the position error based on the voltage value output from the PI sensor 301. Specifically, in a case where the voltage A is output, the turntable 202 is within the movable range, and the system control unit 108 does not determine as the position error. In a case where the voltage B is output, the system control unit 108 determines as the position error where the turntable 202 exceeds the movable range end. In a case where the turntable 202 rotates in the counterclockwise direction, when the PI sensor 302 reaches the movable range end position 305, the PI sensor 302 is shielded by the light-shielding plate 303, and the voltage B is output. On the other hand, in a case where the PI sensor 302 does not reach the movable range end position 305, the PI sensor 302 is not shielded by the light-shielding plate 303. Thus the voltage A is output. Therefore, the system control unit 108 can determine whether there is the position error based on the voltage value output from the PI sensor 302.

In step S105, the system control unit 108 transmits the driving stop request to the motor control unit 109. The motor control unit 109 stops driving the pan driving unit 110 in response to the driving stop request. Specifically, the motor control unit 109 stops the pan driving unit 110 by decelerating the pan motor 210 and performing excitation processing after stopping.

In step S106, the system control unit 108 obtains information about the pan driving speed at which the pan driving unit 110 is driven in step S103 and determines whether the pan driving speed is more than or equal to a predetermined speed (for example, 5°/s). The predetermined speed is stored in the system control unit 108 in advance. This processing is performed because a distance the turntable 202 moves due to inertia before it stops in a case where the pan driving unit 110 is stopped is different depending on whether the pan driving speed is more than or equal to the predetermined speed. In a case where the pan driving speed is more than or equal to the predetermined speed (YES in step S106), the processing proceeds to step S107. Whereas, in a case where the pan driving speed is less than the predetermined speed (NO in step S106), the processing proceeds to step S109.

A relationship between the pan driving speed and the distance the turntable 202 moves before it stops (a deviation amount from the reference position) will now be described. According to the present exemplary embodiment, a time from when the system control unit 108 detects the position error to when the system control unit 108 transmits a stop instruction to the motor control unit 109 is 32 msecs. Therefore, a distance the turntable 202 moves from the time the position error is actually detected to the time the turntable 202 stops can be calculated by multiplying the pan driving speed by the time. For example, in a case where the pan driving speed is 10°/s, a distance (an angle) is +0.32°, and in a case where the pan driving speed is 50°/s, the distance is +1.51°. As the pan driving speed is higher, the distance the turntable 202 moves before it stops is longer, and the PI sensor moves beyond the movable range end and approaches the mechanical end position.

In step S107, the system control unit 108 sets the pan driving speed (the movement speed) to a first speed. Information about the first speed is stored in the system control unit 108 in advance. In this case, the first speed is at least less than the pan driving speed at which the pan driving unit 110 is driven in step S103. Further, the first speed is less than or equal to the predetermined speed compared with the pan driving speed in step S106. The first speed according to the present exemplary embodiment is, for example, 5°/s.

In step S108, the system control unit 108 searches for the reference position. Specifically, the system control unit 108 instructs the motor control unit 109 to rotate the turntable 202 so that the PI sensor moves toward the movable range end position. The motor control unit 109 drives the pan driving unit 110 to rotate the turntable 202. When the PI sensor reaches the movable range end position, the system control unit 108 receives a signal from the pan phase detection unit 113 (the PI sensor) via the phase detection control unit 112. Upon receiving the signal, the system control unit 108 transmits the driving stop request to the motor control unit 109, and the motor control unit 109 stops driving the pan driving unit 110. At that time, for example, the PI sensor 301 stops at a position approximately 0.1° away from the movable range end position 306 toward 0°.

In step S109, the system control unit 108 resets the reference position. Specifically, in a case where the processing proceeds from step S108 to step S109, the system control unit 108 resets the reference position searched in step S108 to the reference position A. On the other hand, in a case where the processing proceeds from step S106 to step S109, the system control unit 108 resets the position at which the driving of the pan driving unit 110 is stopped in step S105 to the reference position A.

According to the present exemplary embodiment, the reference position is set according to the pan driving speed at the time when the movable range end is detected in the pan driving. The distance the turntable 202 moves before it stops is different depending on the pan driving speed. Therefore, in a case where the pan driving speed is low, the reference position is set simpler than that in a case where the pan driving speed is high, and thus the reference position can be set without impairing user operability.

Specifically, in a case where the pan driving speed at the time when the movable range end is detected is less than the predetermined speed, the position at which the turntable 202 stops due to the movable range end being detected is set as the reference position, so that a time required to set the reference position can be shortened. Since a user does not have to interrupt an operation for a long time until the reference position is reset or wait for a long time for setting the reference position again from the beginning, the user operability can be improved.

Further, in a case where the pan driving speed at the time when the movable range end is detected is more than or equal to the predetermined speed, the position at which the movable range end is detected by performing the pan driving from the position at which the turntable 202 stops due to the movable range end being detected is set as the reference position, so that accuracy for setting the reference position can be improved.

As a second exemplary embodiment, a case will be described in which a driving range of the pan driving is set (range setting) according to the pan driving speed at the time when the position error is detected.

Figure 5:
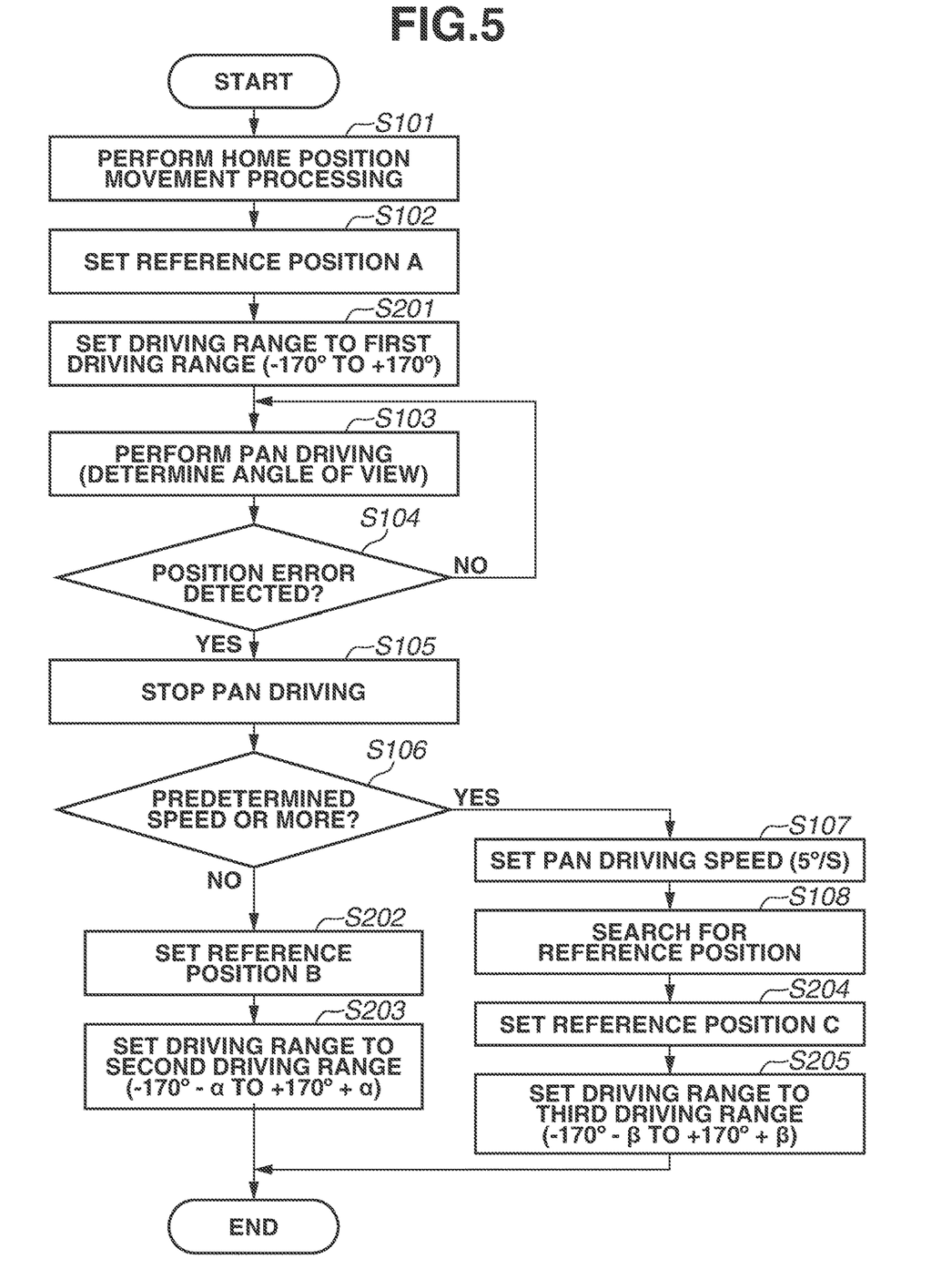
FIG. 5 is a flowchart illustrating an example of an operation according to a second exemplary embodiment.

FIG. 5 is a flowchart illustrating an operation according to the second exemplary embodiment. In the flowchart in FIG. 5, the same processing as that in the flowchart in FIG. 4 is denoted by the same step number as that in FIG. 4, and the description thereof is omitted as appropriate. In FIG. 5, steps S201 to S205 are added to the flowchart in FIG. 4.

In step S201, the system control unit 108 sets the driving range of the pan driving to a first driving range of −170° to +170°. The system control unit 108 performs control to allow a user to perform the pan operation in the first driving range.

In step S202, the system control unit 108 resets the reference position. Specifically, the system control unit 108 sets the position at which driving of the pan driving unit 110 is stopped in step S105 as a reference position B.

In step S203, the system control unit 108 resets the driving range of the pan driving by adding a distance based on a time lag from when the position error is detected to when the turntable 202 stops. Specifically, the system control unit 108 calculates a distance a which the turntable 202 moves before it stops based on the pan driving speed at which the pan driving unit 110 is driven in step S103 and a predetermined time until the turntable 202 stops. Next, the system control unit 108 resets the driving range of the pan driving to a second driving range by extending the first driving range by the distance a. For example, in a case where the pan driving speed is 10°/s, and the predetermined time is 32 msecs, the distance at the turntable 202 moves before it stops is 0.32°. Therefore, the driving range of the pan driving is set from −170.32° to +170.32°.

In step S204, the system control unit 108 resets the reference position. Specifically, the system control unit 108 sets the reference position searched in step S108 to a reference position C.

In step S205, the system control unit 108 resets the driving range of the pan driving by adding a predetermined distance. Specifically, the system control unit 108 calculates a distance β which the turntable 202 moves before it stops based on the pan driving speed at which the pan driving unit 110 is driven in step S107 and the predetermined time until the turntable 202 stops. Next, the system control unit 108 resets the driving range of the pan driving to a third driving range by extending the first driving range by the distance β. For example, in a case where the pan driving speed is 5°/s, and the predetermined time is 32 msecs, the distance β which the turntable 202 moves before it stops is 0.16°. Therefore, the driving range of the pan driving is set from −170.16° to +170.16°. In step S205, the pan driving speed is a speed stored in advance, and the predetermined time is constant, so that the distance β is a constant value (the predetermined distance). Accordingly, the third driving range is a predetermined range set in advance.

According to the present exemplary embodiment, in a case where the pan driving speed at the time when the movable range end is detected is less than the predetermined speed, the driving range is set by adding a distance the turntable 202 moves from the time the movable range end is detected to the time it stops to the driving range set in advance. On the other hand, in a case where the pan driving speed at the time when the movable range end is detected is more than or equal to the predetermined speed, the driving range is set by adding the predetermined distance to the driving range set in advance. Therefore, even if the position error occurs, the driving range can be secured without narrowing the driving range of the pan driving set in advance.

According to a third exemplary embodiment, a case will be described in which a detection cycle for detecting the position error is switched in a case where the driving range of the pan driving is extended.

Figure 6:
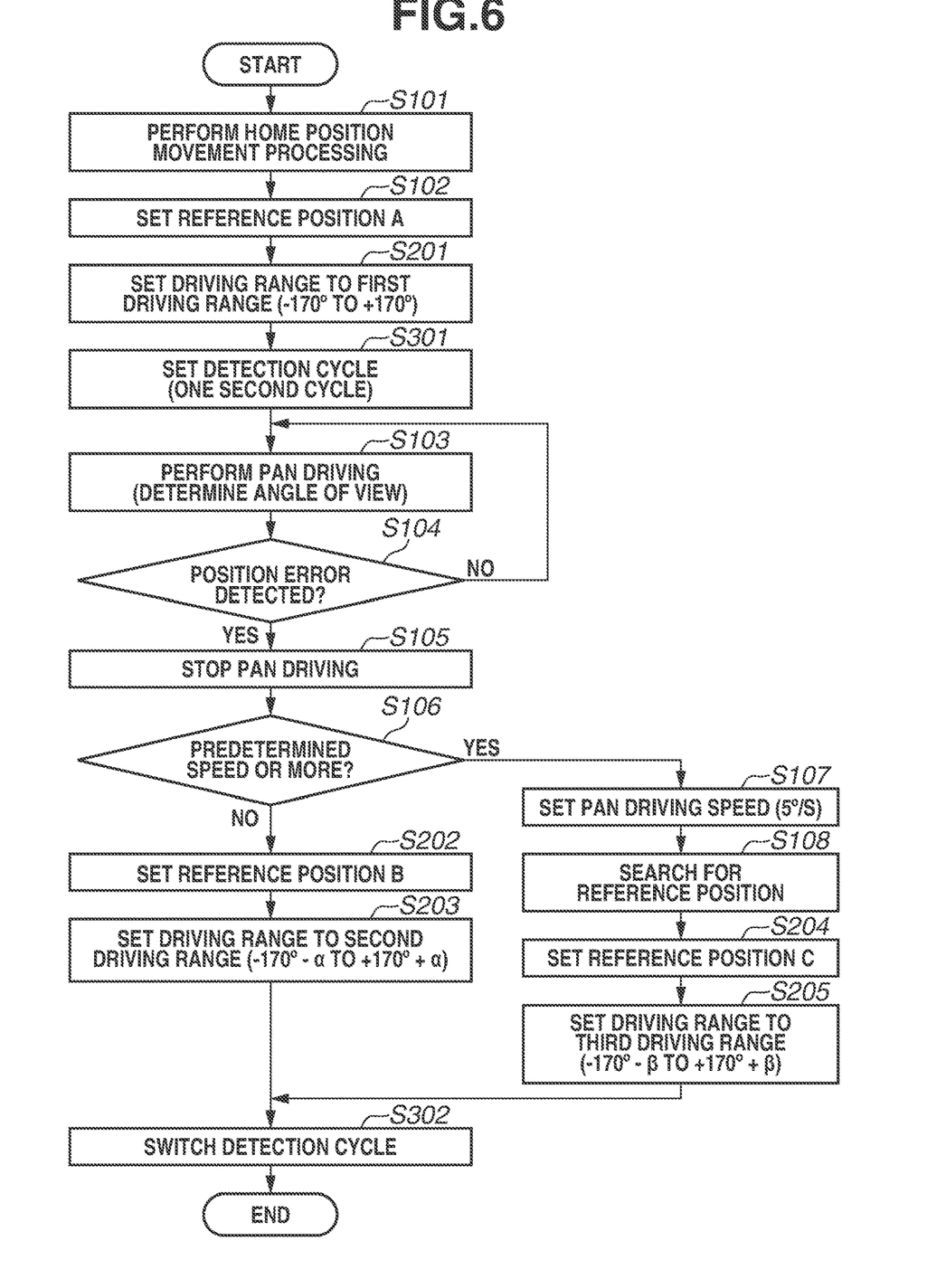
FIG. 6 is a flowchart illustrating an example of an operation according to a third exemplary embodiment.

FIG. 6 is a flowchart illustrating an operation according to the third exemplary embodiment. In the flowchart in FIG. 6, the processing the same as that in the flowcharts in FIGS. 4 and 5 is denoted by the same step number as that in FIGS. 4 and 5, and the description thereof is omitted as appropriate. In FIG. 6, steps S301 and S302 are added to the flowchart in FIG. 5.

In step S301, the system control unit 108 sets the detection cycle for the phase detection control unit 112 to T1 (for example, one second).

In step S302, the system control unit 108 switches and resets the detection cycle for the phase detection control unit 112 to T2. A value of T2 is less than a value of T1. According to the present exemplary embodiment, the PI sensor is used as the pan phase detection unit 113. The PI sensor has a characteristic that an output voltage decreases as an integrated energization time becomes longer. Therefore, in order to prolong a product life of the PI sensor, the PI sensor is set to be intermittently controlled to shorten the ON period. According to the present exemplary embodiment, the PI sensor performs PI control at a one second cycle (the ON period of 30 msecs+the OFF period of 9970 msecs) which is relatively long. In addition, a distance from the movable range end position to the mechanical end position is designed so that the PI sensor can detect the position error without reaching the mechanical end position even at the one second cycle. However, in a case where the driving range is extended in steps S203 and S205, the turntable 202 will rotate to the mechanical end position if the PI sensor remains in the one second cycle. As a result, a member which rotates and a member which does not rotate in the pan driving may collide with each other. By shortening the detection cycle in step S302, the position error can be quickly detected, and the member which rotates and the member which does not rotate in the pan driving can be prevented from colliding with each other.

According to the present exemplary embodiment, the detection cycle is switched to be shorter in a case where the driving range of the pan driving is set to an extended range, and accordingly, the member which rotates and the member which does not rotate in the pan driving can be prevented from colliding with each other even if the position error is detected.

According to a fourth exemplary embodiment, a case will be described in which a position at which the turntable 202 stops due to the position error being detected after the driving range of the pan driving is set to an extended range and reset as the reference position.

Figure 7:
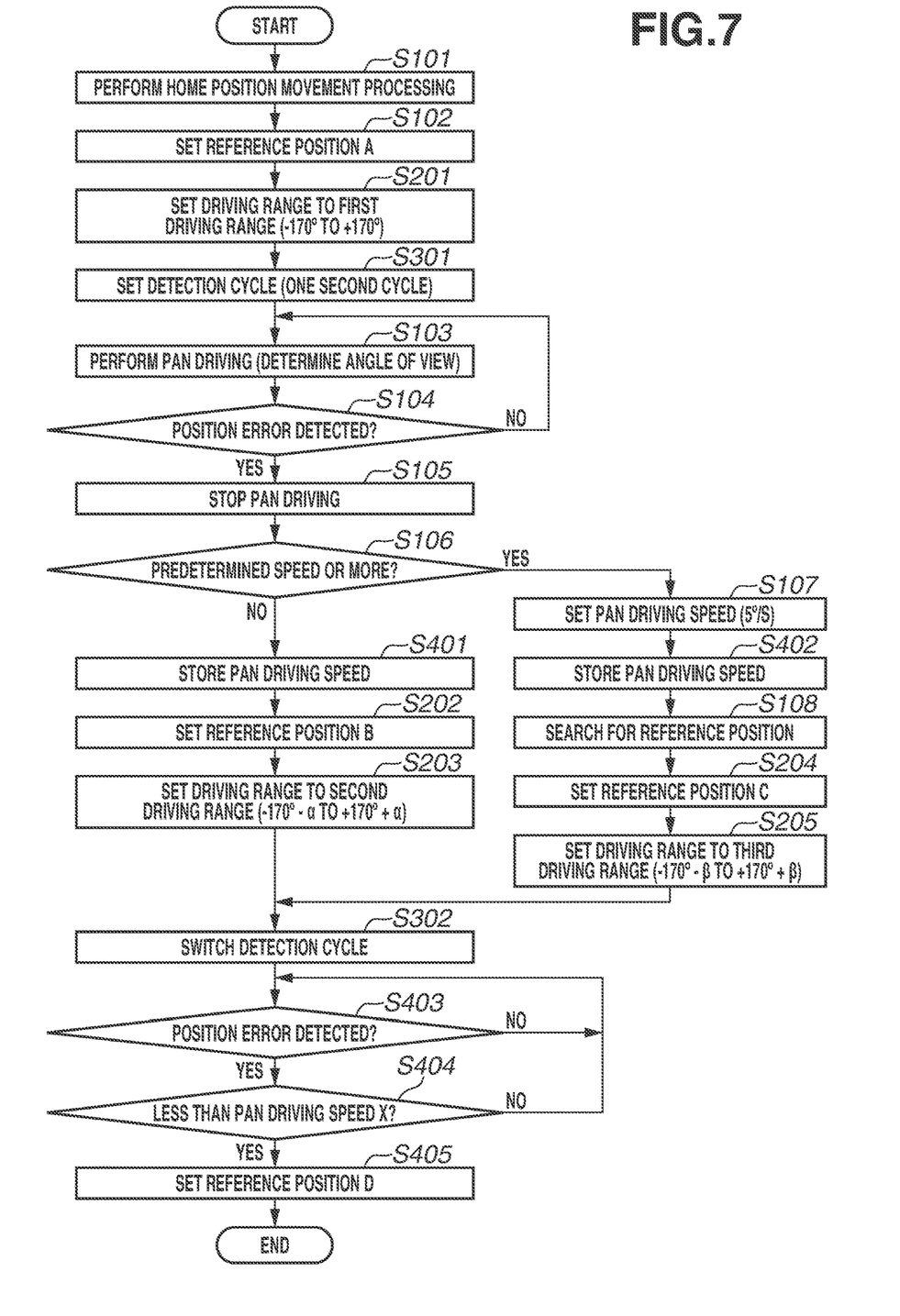
FIG. 7 is a flowchart illustrating an example of an operation according to a fourth exemplary embodiment.

FIG. 7 is a flowchart illustrating an operation according to the fourth exemplary embodiment. In the flowchart in FIG. 7, the processing the same as that in the flowcharts in FIGS. 4 to 6 is denoted by the same step number as that in FIGS. 4 to 6, and the description thereof is omitted as appropriate. In FIG. 7, steps S401 to S405 are added to the flowchart in FIG. 6.

In step S401, the system control unit 108 stores information about a pan driving speed X compared with the predetermined speed in step S106.

In step S402, the system control unit 108 stores the information about the pan driving speed X at which the pan driving unit 110 is driven in step S107.

In step S403, the system control unit 108 determines whether the position error is detected. In a case where the position error is detected (YES in step S403), the processing proceeds to step S404. Whereas, in a case where the position error is not detected (NO in step S403), the processing returns to step S403. Processing in step S403 is similar to that in step S104, but the position error detection processing is performed at the detection cycle switched and set in step S302.

In step S404, the system control unit 108 obtains information about the current pan driving speed at the time when the position error is detected in step S403. Next, the system control unit 108 compares the current pan driving speed with the pan driving speed X at the time when the reference position is reset last time. Specifically, the system control unit 108 compares the current pan driving speed with the pan driving speed X stored in step S401 or S402 and determines whether the current pan driving speed is less than the stored pan driving speed X. In a case where the current pan driving speed is less than the stored pan driving speed X (YES in step S404), the processing proceeds to step S405. Whereas, in a case where the current pan driving speed is not less than the stored pan driving speed X (NO in step S404), the processing returns to step S403.

In step S405, the system control unit 108 receives a signal of the position error from the pan phase detection unit 113 via the motor control unit 109 and transmits the driving stop request to the motor control unit 109. The motor control unit 109 stops driving the pan driving unit 110 in response to the driving stop request. The system control unit 108 resets the position at which the driving of the pan driving unit 110 is stopped to a reference position D.

According to the present exemplary embodiment, in a case where the position error is detected after the driving range of the pan driving is extended and set, the pan driving speed at the time when the position error is detected is less than the pan driving speed at the time when the reference position is reset last time. In this case, the position at which the turntable 202 stops due to the position error being detected after the driving range of the pan driving is extended and set is reset as the reference position. Therefore, even after the driving range of the pan driving is extended and set, a movable range end can be brought closer to an initial reference position during the operation.

According to a fifth exemplary embodiment, a case in which a user is notified of detection of the position error and a case in which a user issues an instruction on a movement to a preset position will be described.

Figure 8A:
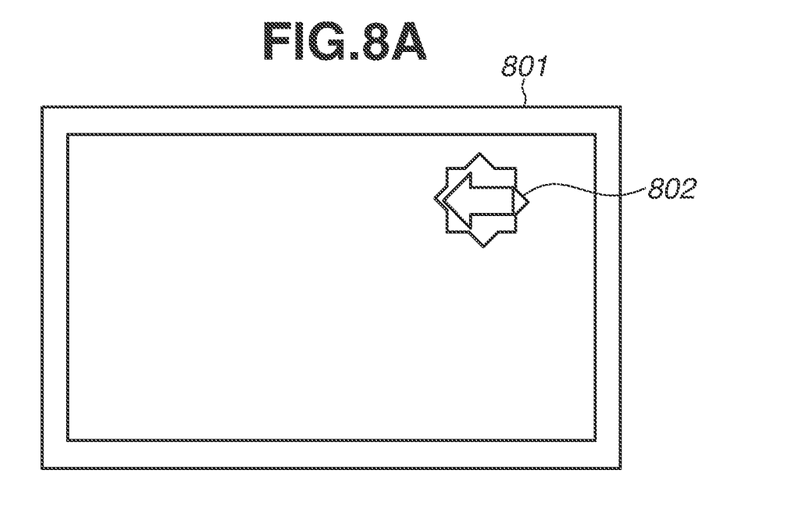
FIGS. 8A to 8C illustrate a fifth exemplary embodiment.

FIG. 8A illustrates an example of a screen 801 to be displayed on a display unit of the client apparatus. An image distributed from the remote camera 100 is displayed on the screen 801.

In a case where the system control unit 108 of the remote camera 100 detects the position error, the system control unit 108 transmits information about the position error to the client apparatus via the network 120. The client apparatus receives the information about the position error and then displays a display icon 802 indicating that the pan driving is performed beyond the movable range end on the screen 801. The display icon 802 is displayed, and thus a user can recognize that the position error occurs.

Figure 8B:
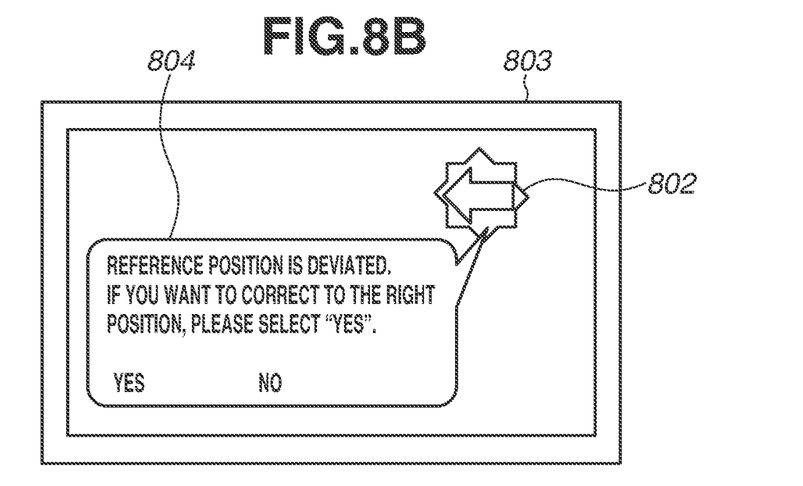

FIG. 8B illustrates an example of a screen 803 to be displayed on the display unit of the client apparatus. In the screen 803, a message 804 for allowing a user to select whether to perform processing for searching for the reference position is displayed. When the remote camera 100 receives information about the selection for performing the processing for searching for the reference position, the system control unit 108 starts the processing, for example, in step S106 and subsequent steps in FIG. 4 and resets the reference position in step S109. On the other hand, if the remote camera 100 receives information about the selection for not performing the processing for searching for the reference position, the system control unit 108 returns the processing, for example, to step S103 in FIG. 4 without performing the processing in steps S106 to S109.

Figure 8C:
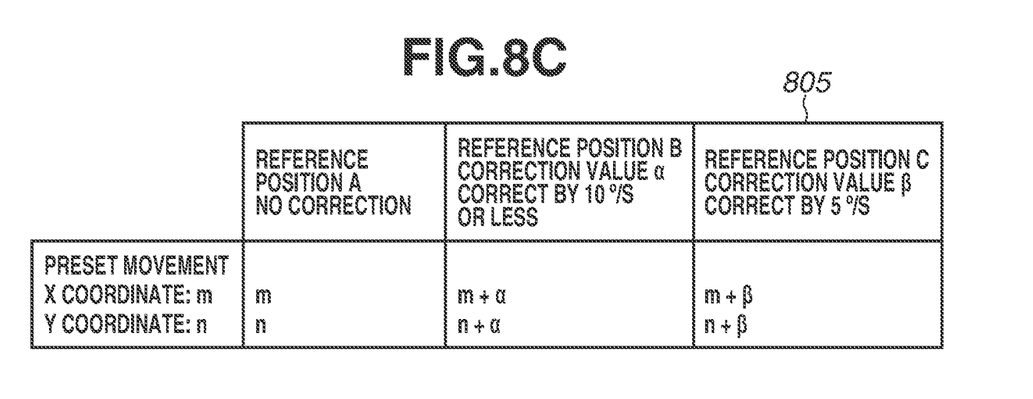

FIG. 8C illustrates an example of a table 805 which is referred to in a case where a movement to the preset position (the reference position) is performed. The table 805 is stored in the system control unit 108. The table 805 stores information about coordinates of each preset position in a case where the reference positions A, B, and C are set according to the second exemplary embodiment. For example, the X coordinate and the Y coordinate are respectively m and n at the reference position A, the X coordinate and the Y coordinate are m+α and n+α at the reference position B, and the X coordinate and the Y coordinate are m+β and n+β at the reference position C. In a case where an instruction to move to the preset position is received from a user, the system control unit 108 moves the turntable 202 to the preset position stored in the table 805 according to the reference position A, B, or C which is currently set. In this way, even when the position error is detected, and the reference position is reset, the turntable 202 can accurately move to the reference position according to the instruction to move to the preset position.

The present disclosure can also be realized by executing the following processing. More specifically, a program for realizing the functions of the above described exemplary embodiments is supplied to a system or an apparatus via a network or various storage media, and a computer (or a CPU or a micro processing unit (MPU)) of the system or the apparatus reads and executes the program. In this case, the program and the storage media storing the program constitutes the present disclosure.

In the above described exemplary embodiments, description has been given on the operations in the pan driving, but the present disclosure can be similarly applied to the operations in the tilt driving.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-086085, filed May 15, 2020, which is hereby incorporated by reference herein in its entirety.

What is claimed is:

1. An image capturing apparatus to perform pan-tilt driving, the image capturing apparatus comprising:
 a detection unit configured to detect a movable range end in a case where the pan-tilt driving is performed;
 an obtaining unit configured to obtain information about a speed of the pan-tilt driving in a case where the movable range end is detected by the detection unit; and
 a setting unit configured to set a reference position according to the driving speed information obtained by the obtaining unit.

2. The image capturing apparatus according to claim 1, wherein, in a case where the driving speed information obtained by the obtaining unit is less than a predetermined speed, the setting unit sets a position at which the image capturing apparatus stops due to the movable range end being detected by the detection unit as the reference position.

3. The image capturing apparatus according to claim 1, wherein, in a case where the driving speed information obtained by the obtaining unit is more than or equal to a predetermined speed, the setting unit sets a position at which the movable range end is detected by the detection unit by performing the pan-tilt driving from a position at which the image capturing apparatus stops due to the movable range end being detected by the detection unit as the reference position.

4. The image capturing apparatus according to claim 3, further comprising a control unit configured to control the pan-tilt driving,
wherein, in the case where the driving speed information obtained by the obtaining unit is more than or equal to the predetermined speed, and the pan-tilt driving is performed from the position at which the image capturing apparatus stops due to the movable range end being detected by the detection unit, the control unit performs the pan-tilt driving at a speed less than or equal to the predetermined speed.

5. The image capturing apparatus according to claim 1, further comprising a range setting unit configured to set a driving range of the pan-tilt driving,
wherein the range setting unit sets the driving range according to the driving speed information obtained by the obtaining unit.

6. The image capturing apparatus according to claim 5, wherein, in a case where the driving speed information obtained by the obtaining unit is less than a predetermined speed, the range setting unit sets the driving range by adding, to a driving range set in advance, a distance based on a time lag from a time when the movable range end is detected by the detection unit to a time when the image capturing apparatus stops.

7. The image capturing apparatus according to claim 5, wherein, in a case where the driving speed information obtained by the obtaining unit is more than or equal to a predetermined speed, the range setting unit sets the driving range by adding a predetermined distance to a driving range set in advance.

8. The image capturing apparatus according to claim 6, further comprising a switching unit configured to switch a detection cycle by the detection unit,
wherein the switching unit switches the detection cycle according to a setting of the added driving range by the range setting unit.

9. The image capturing apparatus according to claim 8, wherein the switching unit switches the detection cycle to a detection cycle shorter than that before the added driving range is set according to the setting of the added driving range by the range setting unit.

10. The image capturing apparatus according to claim 8, wherein the detection unit is a photo interrupter (PI) sensor, and
wherein the switching unit switches a detection cycle by the PI sensor.

11. The image capturing apparatus according to claim 6, wherein, in a case where a speed of the pan-tilt driving at a time of detection of the movable range end by the detection unit after the setting of the added driving range by the range setting unit is less than a speed of the pan-tilt driving at a time of setting of the reference position by the setting unit, the setting unit sets a position at which the image capturing apparatus stops due to the movable range end being detected by the detection unit after the setting of the added driving range by the range setting unit as the reference position.

12. The image capturing apparatus according to claim 1, further comprising a reception unit configured to receive information about selection of a user regarding whether to set the reference position in the case where the movable range end is detected by the detection unit,
wherein the setting unit sets the reference position according to selection by the user to set the reference position.

13. The image capturing apparatus according to claim 1, further comprising:
an acceptance unit configured to accept an instruction from a user to move to a preset position; and
a presetting unit configured to perform, in a case where the acceptance unit accepts the instruction to move to the preset position, the pan-tilt driving to the reference position set according to the driving speed information obtained by the obtaining unit.

14. A method for controlling an image capturing apparatus to perform pan-tilt driving, the method comprising:
detecting a movable range end in a case where the pan-tilt driving is performed;
obtaining information about a speed of the pan-tilt driving in a case where the movable range end is detected; and
setting a reference position according to the obtained driving speed information.

15. A computer-readable storage medium storing a program to cause a computer to perform a method for controlling an image capturing apparatus to perform pan-tilt driving, the method comprising:
detecting a movable range end in a case where the pan-tilt driving is performed;
obtaining information about a speed of the pan-tilt driving in a case where the movable range end is detected; and
setting a reference position according to the obtained driving speed information.

* * * * *